(12) United States Patent
Karlsson et al.

(10) Patent No.: US 8,559,438 B2
(45) Date of Patent: Oct. 15, 2013

(54) MODIFICATION OF LIVE STREAMS

(75) Inventors: Kent Karlsson, San Francisco, CA (US); Ola Hällmarker, Hägersten (SE); Martin Linderoth, Årsta (SE)

(73) Assignee: MOBITV, Inc., Emeryville, CA (US)

( * ) Notice: Subject to any disclaimer, the term of this patent is extended or adjusted under 35 U.S.C. 154(b) by 383 days.

(21) Appl. No.: 12/101,895

(22) Filed: Apr. 11, 2008

(65) Prior Publication Data
US 2009/0257435 A1 Oct. 15, 2009

(51) Int. Cl.
*H04L 12/28* (2006.01)

(52) U.S. Cl.
USPC .......................................................... 370/394

(58) Field of Classification Search
USPC ......... 704/226; 709/231; 375/240.28, 240.12; 370/505, 394
See application file for complete search history.

(56) References Cited

U.S. PATENT DOCUMENTS

| | | | |
|---|---|---|---|
| 7,012,964 B1 * | 3/2006 | Nakano et al. | 375/240.28 |
| 7,539,615 B2 * | 5/2009 | Koistinen et al. | 704/226 |
| 7,764,737 B2 * | 7/2010 | Setton et al. | 375/240.12 |
| 7,889,765 B2 * | 2/2011 | Brooks et al. | 370/505 |
| 2009/0089445 A1 * | 4/2009 | Deshpande | 709/231 |

FOREIGN PATENT DOCUMENTS

WO WO0064161 * 10/2000

OTHER PUBLICATIONS

Kontothanassis, L., "A Transport Layer for Live Streaming in a Content Delivery Network," Proceedings of the IEEE, Jan. 2004, pp. 1-11.

* cited by examiner

*Primary Examiner* — Mark Rinehart
*Assistant Examiner* — Gbemileke Onamuti
(74) *Attorney, Agent, or Firm* — Kwan & Olynick LLP

(57) ABSTRACT

Mechanisms are provided for generating and modifying live media streams. A device establishes a session and requests a media stream from a content server. The content server provides the media stream to the device. The content server also obtains an insertion stream for inclusion in the media stream. Packets are removed from the media stream to allow inclusion of the insertion stream. Timestamp information and sequence number information is maintained to allow uninterrupted delivery of the modified media stream.

20 Claims, 6 Drawing Sheets

| RTP Sequence Removed 421 | 11 | 11 | 12 | 13 | 14 | 15 | 16 |
|---|---|---|---|---|---|---|---|
| | 4310 | 4311 | 4312 | 4313 | 4314 | 4315 | 4316 |
| | 0 | 0 | 0 | 0 | 0 | 0 | 0 |
| | I | I | P | P | B | P | B |

| RTP Packet Stream 401 | | | | | | | |
|---|---|---|---|---|---|---|---|
| Timestamp 403 | 6 | 6 | 6 | 7 | 8 | 9 | 10 |
| Sequence Number 405 | 4303 | 4304 | 4305 | 4306 | 4307 | 4308 | 4309 |
| Marker 407 | 0 | 0 | 0 | 0 | 0 | 0 | 0 |
| Data Frame 409 | I | I | I | P | B | P | P |

| 17 | 17 |
|---|---|
| 4318 | 4319 |
| 0 | 0 |
| I | I |

| RTP Sequence Inserted 411 | 11 | 11 | 11 | 12 | 13 | 14 | 15 | 16 |
|---|---|---|---|---|---|---|---|---|
| | 4310 | 4311 | 4312 | 4313 | 4314 | 4315 | 4316 | 4317 |
| | 0 | 0 | 0 | 0 | 0 | 0 | 0 | 0 |
| | I | I | I | B | P | P | B | B |

| RTP Packet Stream 301 | | | | | | | | | | | | | | | | | |
|---|---|---|---|---|---|---|---|---|---|---|---|---|---|---|---|---|---|
| Timestamp 303 | 6 | 6 | 6 | 7 | 8 | 9 | 10 | 11 | 11 | 12 | 13 | 14 | 15 | 16 | 17 | 17 |
| Sequence Number 305 | 4303 | 4304 | 4305 | 4306 | 4307 | 4308 | 4309 | 4310 | 4311 | 4312 | 4313 | 4314 | 4315 | 4316 | 4317 | 4318 |
| Marker 307 | 0 | 0 | 0 | 0 | 0 | 0 | 0 | 0 | 0 | 0 | 0 | 0 | 0 | 0 | 0 | 0 |
| Data Frame 309 | I | I | I | P | B | P | P | I | I | P | P | B | P | B | I | I |

Figure 3

| RTP Packet Stream 401 | | | | | | | | |
|---|---|---|---|---|---|---|---|---|
| Timestamp 403 | 6 | 6 | 6 | 7 | 8 | 9 | 10 |
| Sequence Number 405 | 4303 | 4304 | 4305 | 4306 | 4307 | 4308 | 4309 |
| Marker 407 | 0 | 0 | 0 | 0 | 0 | 0 | 0 |
| Data Frame 409 | I | I | I | P | B | P | P |

| | 17 | 17 |
|---|---|---|
| | 4318 | 4319 |
| | 0 | 0 |
| | I | I |

| RTP Sequence Inserted 411 | | | | | | | |
|---|---|---|---|---|---|---|---|
| 11 | 11 | 11 | 12 | 13 | 14 | 15 | 16 |
| 4310 | 4311 | 4312 | 4313 | 4314 | 4315 | 4316 | 4317 |
| 0 | 0 | 0 | 0 | 0 | 0 | 0 | 0 |
| I | I | I | B | P | P | P | B |

| RTP Sequence Removed 421 | | | | | | |
|---|---|---|---|---|---|---|
| 11 | 11 | 12 | 13 | 14 | 15 | 16 |
| 4310 | 4311 | 4312 | 4313 | 4314 | 4315 | 4316 |
| 0 | 0 | 0 | 0 | 0 | 0 | 0 |
| I | I | P | P | B | P | B |

Figure 4

MODIFICATION OF LIVE STREAMS

TECHNICAL FIELD

The present disclosure relates to generation and processing of media streams.

DESCRIPTION OF RELATED ART

Protocols such as the Real-Time Transport Protocol (RTP) are used to transport video and audio data over networks. A separate session is used to carry each content stream such as a video or audio stream. RTP specifies a standard packet format that is used to carry video and audio data such as Moving Pictures Expert Group (MPEG) video data including MPEG-2 and MPEG-4 video frames. In many instances, multiple frames are included in a single RTP packet. The MPEG frames themselves may be reference frames or may be frames encoded relative to a reference frame.

Conventional techniques and mechanisms for generating and processing video streams are limited. In many instances, video streams can not be modified in an efficient and effective manner. Consequently, it is desirable to provide techniques and mechanisms for generating and processing media streams such as video and audio streams.

BRIEF DESCRIPTION OF THE DRAWINGS

The disclosure may best be understood by reference to the following description taken in conjunction with the accompanying drawings, which illustrate particular embodiments.

FIG. 3 illustrates one example of an RTP stream.

FIG. 4 illustrates one example of modification of an RTP stream including removal and insertion of packets.

DESCRIPTION OF EXAMPLE EMBODIMENTS

Figure 1:
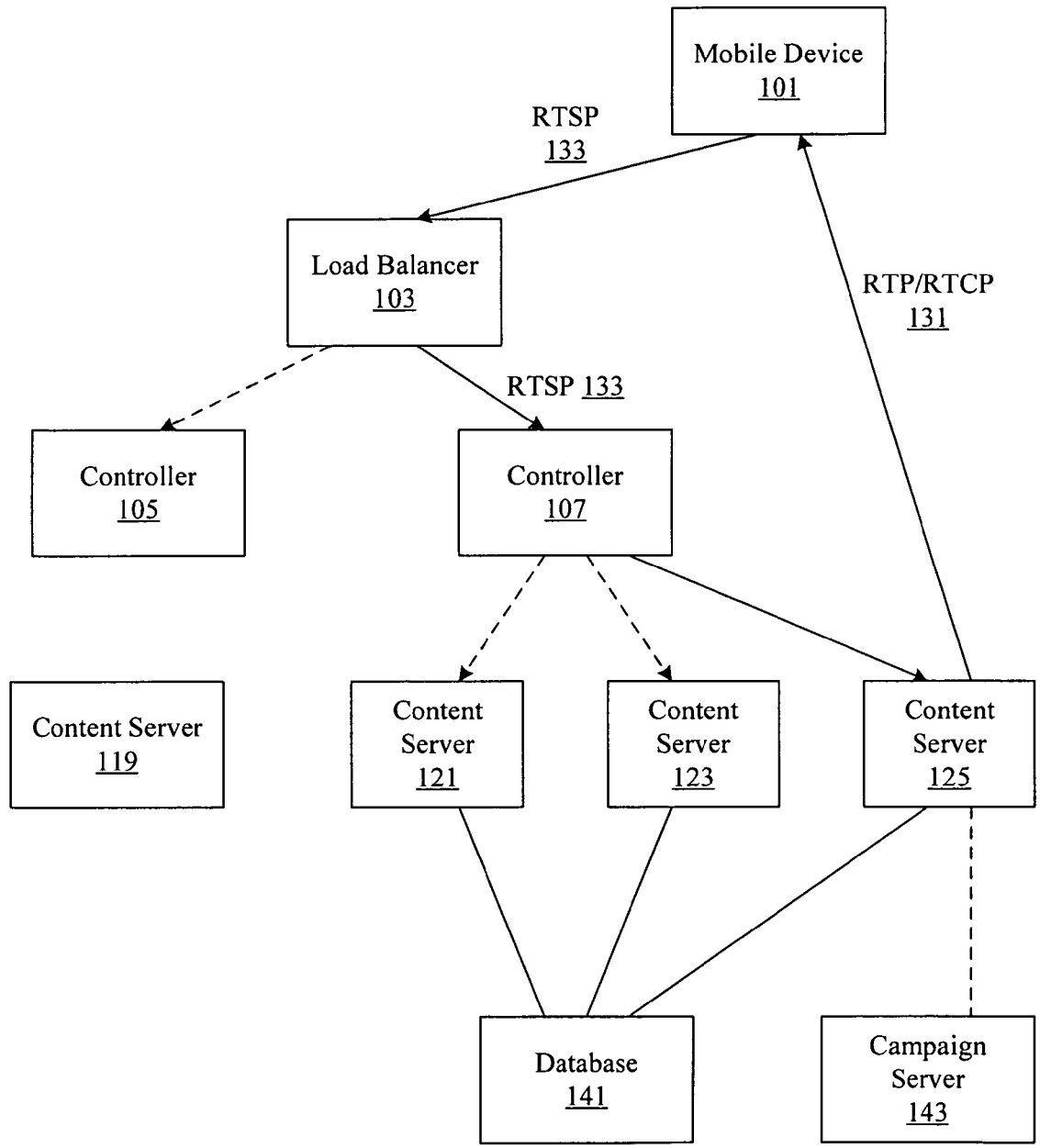
FIG. 1 illustrates an exemplary system for use with embodiments of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the Real-Time Transport Protocol (RTP) and the Real-Time Streaming Protocol (RTSP). However, it should be noted that the techniques of the present invention apply to a variations of RTP and RTSP. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors can while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided for generating and modifying live media streams. A device establishes a session to obtain a media stream from a content server. The content server provides the media stream to the device. The content server also obtains an insertion stream for inclusion in the media stream. Packets are removed from the media stream to allow inclusion of the insertion stream. Timestamp information and sequence number information is maintained and modified to allow delivery of the modified media stream without modification of a device application.

Example Embodiments

A variety of mechanisms are used to deliver media streams to devices. In particular examples, a client establishes a session such as a Real-Time Streaming Protocol (RTSP) session. A server computer receives a connection for a media stream, establishes a session, and provides a media stream to a client device. The media stream includes packets encapsulating frames such as Moving Pictures Expert Group (MPEG) frames. The MPEG frames themselves may be key frames or differential frames. The specific encapsulation methodology used by the server depends on the type of content, the format of that content, the format of the payload, the application and transmission protocols being used to send the data. After the client device receives the media stream, the client device decapsulates the packets to obtain the MPEG frames and decodes the MPEG frames to obtain the actual media data.

In many instances, a server computer obtains media data from a variety of sources, such as media libraries, cable providers, satellite providers, and processes the media data into MPEG frames such as MPEG-2 or MPEG-4 frames. In particular examples, encoding video and audio into MPEG formatted frames is a resource intensive task. Consequently, server computers will often encode only a limited number of streams for a particular channel. In particular examples, a server computer may encode six media streams of varying bit rates for a particular channel for distribution to a variety of disparate devices. However, thousands of different users may be viewing a particular channel. In many instances, it is desirable to provide a more customized and individualized viewing experience for users.

Some conventional systems allow a user with a particular client to select a media stream for viewing or listening. Instead of providing the requested media stream, a content server can send an advertisement stream to the user before sending the requested media stream. The advertisement stream is limited in scope as it can only be inserted at the beginning of a media stream. This advertising stream first feature requires a client to have an application supporting the specific feature. The client application is also required to restart buffering or even restart a session before playing the requested media stream. It is contemplated that an advertising stream can also be provided at the end of a media stream. However, the same limitations apply, as the client application has to support the particular feature set and is also required to restart buffering or even restart a session to play the advertising stream.

Another mechanism for modifying media streams entails modifying the media itself. For example, an MPEG media stream can be decoded to obtain individual frames. The individual frames of data can then be replaced with replacement frames. However, this requires both decapsulation of RTP packets as well as decoding of MPEG frames, which is a resource intensive process. After the video data is modified, the video data is reencoded into MPEG frames and reencapsulated in RTP packets. Performing these operations for media such as video clips is resource intensive. However, performing these operations for live video is impractical, even on a very limited scale.

Consequently, the techniques and mechanisms of the present invention allow modification of media streams in an efficient and effective manner.

Media data such as a variety of video and audio clips are prepared for dynamic insertion into live media streams. According to various embodiments, a content server is provided with the capability to modify a live stream by selectively inserting compatible streams and/or removing portions of the live stream as necessary to maintain live stream timing. A client device need not support any special feature set. In particular examples, the client device does not recognize that the original live stream was modified to add content, remove content, or replace content. Timing and sequence information in an RTP stream is maintained. A client device can not distinguish between a live stream modified by a content server and an original live stream.

According to various embodiments, media streams include sequence numbers and timing information that make live media streams difficult to modify. In particular examples, modifying a live stream entails not only finding a compatible stream for insertion with similar bit-rate and timing constraints, but also maintenance and modification of sequence information in order to provide seamless client device operation.

FIG. 1 is a diagrammatic representation illustrating one example of a system that can use the techniques and mechanisms of the present invention. According to various embodiments, content servers 119, 121, 123, and 125 are configured to provide media content to a mobile device 101 using protocols such as RTP and RTCP. Although a mobile device 101 is shown, it should be recognized that other devices such as set top boxes and computer systems can also be used. In particular examples, the content servers 119, 121, 123, and 125 can themselves establish sessions with mobile devices and stream video and audio content to mobile devices. However, it is recognized that in many instances, a separate controller such as controller 105 or controller 107 can be used to perform session management using a protocol such as RTSP. It is recognized that content servers require the bulk of the processing power and resources used to provide media content mobile devices. Session management itself may include far fewer transactions. Consequently, a controller can handle a far larger number of mobile devices than a content server can. In some examples, a content server can operate simultaneously with thousands of mobile devices, while a controller performing session management can manage millions of mobile devices simultaneously.

By separating out content streaming and session management functions, a controller can select a content server geographically close to a mobile device 101. It is also easier to scale, as content servers and controllers can simply be added as needed without disrupting system operation. A load balancer 103 can provide further efficiency during session management using RTSP 133 by selecting a controller with low latency and high throughput.

According to various embodiments, the content servers 119, 121, 123, and 125 have access to a campaign server 143. The campaign server 143 provides profile information for various mobile devices 101. In some examples, the campaign server 143 is itself a content server or a controller. The campaign server 143 can receive information from external sources about devices such as mobile device 101. The information can be profile information associated with various users of the mobile device including interests and background. The campaign server 143 can also monitor the activity of various devices to gather information about the devices. The content servers 119, 121, 123, and 125 can obtain information about the various devices from the campaign server 143. In particular examples, a content server 125 uses the campaign server 143 to determine what type of media clips a user on a mobile device 101 would be interested in viewing.

According to various embodiments, the content servers 119, 121, 123, and 125 are also receiving media streams from content providers such as satellite providers or cable providers and sending the streams to devices using RTP 131. In particular examples, content servers 119, 121, 123, and 125 access database 141 to obtain desired content that can be used to supplement streams from satellite and cable providers. In one example, a mobile device 101 requests a particular stream. A controller 107 establishes a session with the mobile device 101 and the content server 125 begins streaming the content to the mobile device 101 using RTP 131. In particular examples, the content server 125 obtains profile information from campaign server 143.

In some examples, the content server 125 can also obtain profile information from other sources, such as from the mobile device 101 itself. Using the profile information, the content server can select a clip from a database 141 to provide to a user. In some instances, the clip is injected into a live stream without affecting mobile device application performance. In other instances, the live stream itself is replaced with another live stream. The content server handles processing to make the transition between streams and clips seamless from the point of view of a mobile device application. In still other examples, advertisements from a database 141 can be intelligently selected from a database 141 using profile information from a campaign server 143 and used to seamlessly replace default advertisements in a live stream. Content servers 119, 121, 123, and 125 have the capability to manipulate RTP packets to allow introduction and removal of media content.

Figure 2:
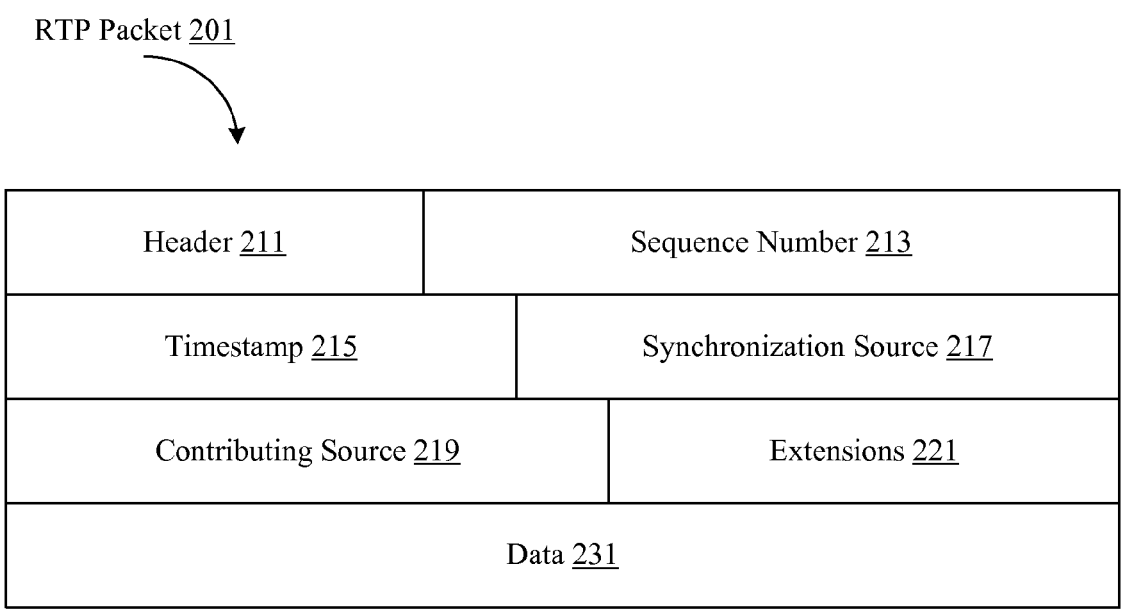
FIG. 2 illustrates one example of a Real-Time Transport Protocol (RTP) packet.

FIG. 2 illustrates one example of an RTP packet. An RTP packet 201 includes a header 211. According to various embodiments, the header 211 includes information such as the version number, amount of padding, protocol extensions, application level, payload format, etc. The RTP packet 201 also includes a sequence number 213. Client applications receiving RTP packets expect that the sequence numbers for received packets be unique. If different packets have the same sequence number, erroneous operation can occur. RTP packets also have a timestamp 215 that allows jitter and synchronization calculations. Fields 217 and 219 identify the synchronization source and the contributing source. Extensions are provided in field 221.

According to various embodiments, data 231 holds actual media data such as MPEG frames. In some examples, a single RTP packet 201 holds a single MPEG frame. In many instances, many RTP packets are required to hold a single MPEG frame. In instances where multiple RTP packets are required for a single MPEG frame, the sequence numbers change across RTP packets while the timestamp 215 remains the same across the different RTP packets. Different MPEG frames include I-frames, P-frames, and B-frames. I-frames are intraframes coded completely by itself. P-frames are predicted frames which require information from a previous I-frame or P-frame. B-frames are bi-directionally predicted frames that require information from surrounding I-frames and P-frames.

Because different MPEG frames require different numbers of RTP packets for transmission, two different streams of the same time duration may require different numbers of RTP packets for transmission. Simply replacing a clip with another clip would not work, as the clips may have different numbers of RTP packets and having different impacts on the sequence numbers of subsequent packets.

FIG. 3 illustrates one example of an RTP packet stream. An RTP packet stream 301 includes individual packets having a variety of fields and payload data. According to various embodiments, the fields include a timestamp 303, sequence 305, marker 307, etc. The packets also include payload data 309 holding MPEG frames such as I, P, and B-frames. Timestamps for different packets may be the same. In particular examples, several packets carrying portions of the same I-frame have the same time stamp. However, sequence numbers are different for each packet. Marker bits 307 can be used for different purposes, such as signaling the starting point of an advertisement.

According to various embodiments, packets with sequence numbers 4303, 4304, and 4305 carrying potions of the same I-frame and have the same timestamp of 6. Packets with sequence numbers 4306, 4307, 4308, and 4309 carry P, B, P, and P-frames and have timestamps of 7, 8, 9, and 10 respectively. Packets with sequence numbers 4310 and 4311 carry different portions of the same I-frame and both have the same timestamp of 11. Packets with sequence numbers 4312, 4313, 4314, 4315, and 4316 carry P, P, B, P, and B-frames respectively and have timestamps 12, 13, 14, 15, and 16. It should be noted that the timestamps shown in FIG. 3 are merely representational. Actual timestamps can be computed using a variety of mechanisms.

For many audio encodings, the timestamp is incremented by the packetization interval multiplied by the sampling rate. For example, for audio packets having 20 ms of audio sampled at 8,000 Hz, the timestamp for each block of audio increases by 160. The actual sampling rate may also differ slightly from this nominal rate. For many video encodings, the timestamps generated depend on whether the application can determine the frame number. If the application can determine the frame number, the timestamp is governed by the nominal frame rate. Thus, for a 30 f/s video, timestamps would increase by 3,000 for each frame. If a frame is transmitted as several RTP packets, these packets would all bear the same timestamp. If the frame number cannot be determined or if frames are sampled a periodically, as is typically the case for software codecs, the timestamp may be computed from the system clock.

While the timestamp is used by a receiver to place the incoming media data in the correct timing order and provide playout delay compensation, the sequence numbers are used to detect loss. Sequence numbers increase by one for each RTP packet transmitted, timestamps increase by the time "covered" by a packet. For video formats where a video frame is split across several RTP packets, several packets may have the same timestamp. For example, packets with sequence numbers 4317 and 4318 have the same timestamp 17 and carry portions of the same I-frame.

FIG. 4 illustrates one example of RTP packet stream modification. An RTP packet stream 401 includes individual packets having a variety of fields and payload data. According to various embodiments, the fields include a timestamp 403, sequence 405, marker 407, etc. The packets also include payload data 409 holding MPEG frames such as I, P, and B-frames. Timestamps for different packets may be the same. In particular examples, several packets carrying portions of the same I-frame have the same time stamp. However, sequence numbers are different for each packet. Marker bits 407 can be used for different purposes, such as signaling the starting point of an advertisement.

According to various embodiments, packets with sequence numbers 4303, 4304, and 4305 carrying potions of the same I-frame and have the same timestamp of 6. Packets with sequence numbers 4306, 4307, 4308, and 4309 carry P, B, P, and P-frames and have timestamps of 7, 8, 9, and 10 respectively. According to various embodiments, a content server removes multiple packets from an RTP packet stream 401, including packets with sequence numbers 4310 through 4316. The packets with sequence numbers 4310 and 4311 carry different portions of the same I-frame and both have the same timestamp of 11.

Packets with sequence numbers 4312, 4313, 4314, 4315, 4316 carry P, P, B, P, and B-frames respectively and have timestamps 12, 13, 14, 15, and 16. The spliced stream now ends at packet with sequence number 4309 carrying a P-frame. A B-frame is included in packet having sequence number 4307. It should be noted that B-frames sometimes may depend on information included in a subsequent I-frame which has been removed. Although having a few B-frames lacking reference frames is not extremely disruptive, it can sometimes be noticed. Therefore, the techniques of the present invention recognize that in some embodiments, the last packets left in a stream prior to splicing should be an I-frame or a P-frame.

According to various embodiments, now that a portion of the RTP stream has been removed, an RTP sequence 411 can be inserted. In particular examples, the RTP sequence inserted 411 begins with an I-frame for subsequent P and B-frames to reference. Without an I-frame for reference, an RTP sequence inserted may begin with a partial or incomplete picture. The packets for insertion are modified to have sequence numbers following the last sequence number of spliced packet stream 401. RTP insertion sequence 411 has sequence numbers 4310-4317 corresponding to packets carrying I, I, I, B, P, P, B, B, frames respectively, with the I-frame carried in three packets with the same time stamp of 11 and the B, P, P, B, an B-frames having timestamps of 12-16 respectively.

For example, packets with sequence numbers 4317 and 4318 have the same timestamp 17 and carry portions of the same I-frame. In some instances, the number of packets in the RTP sequence removed 421 will be exactly the same as the number of packets in the RTP sequence for insertion 411. However, in many instances, the number of packets removed and inserted will differ. For example, some frames may require more than one packet for transmission. Although timestamps can be configured to be the same, so that a 5 second clip can be replaced with another 5 second clip, the number of packets and consequently the sequence numbers can be thrown askew. According to various embodiments, packet with sequence number 4309 is referred to herein as a data stream end point packet. Packet with sequence number 4318 is referred to herein as a data stream restart point packet. Packets with sequence numbers 4310 and 4316 in removed sequence are referred to herein as the removed sequence start packet and the removed sequence end packet respectively. Packets with sequence numbers 4310 and 4316 in the insertion sequence are referred to herein as the insertion sequence start packet and the insertion sequence end packet respectively.

Consequently, the content server maintains a current sequence number per RTP data stream and modified subsequent packets after removing and inserting streams. For example, packets having timestamp 17 are modified to have sequence numbers 4318 and 4319 instead of 4317 and 4318. The content server then proceeds to update subsequent timestamps in the RTP data stream. According to various embodiments, this operation is uniquely performed at a content server because the content server has information about individual mobile devices and also is able to know information about the sequence numbers of an entire content stream. A content provider may not know information about individual mobile devices, whereas a network device or network switch may not receive all data packets in a sequence. Some packets may have been dropped while others may have been transmitted on different paths.

Figure 5:
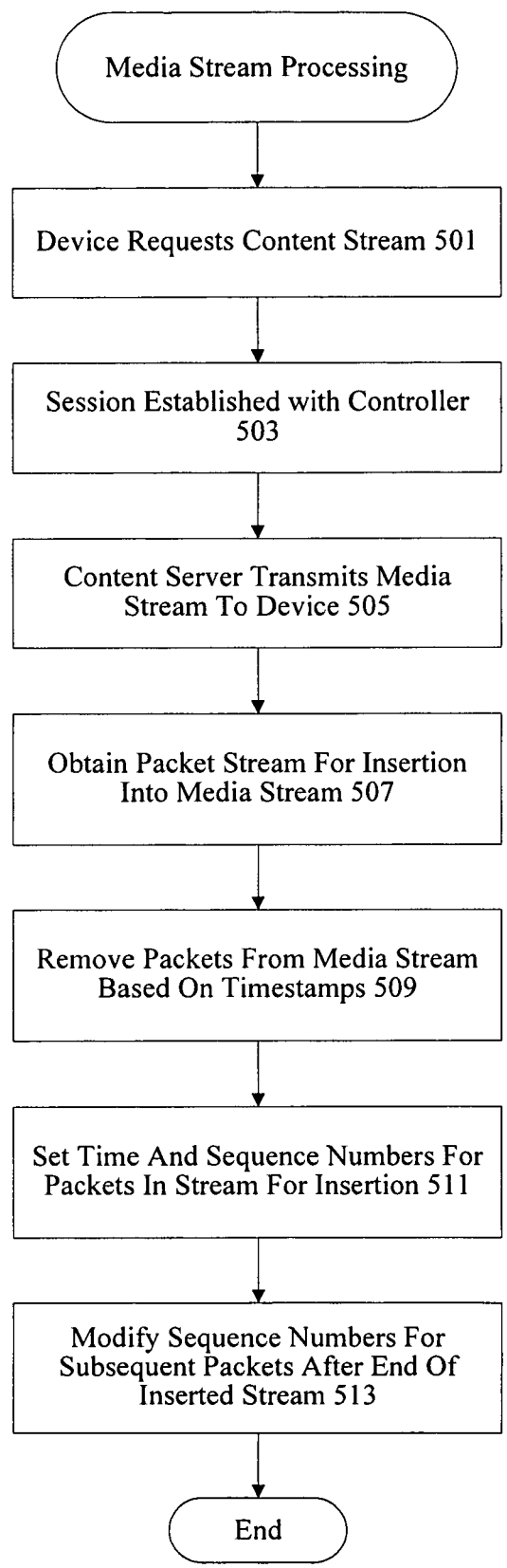
FIG. 5 is a flow process diagram showing one technique for processing an RTP stream.

FIG. 5 is a flow process diagram illustrating one example of RTP packet stream modification. At 501, a device such as a mobile device requests a content stream. According to various embodiments, the content request is passed to a load balancer that directs the request to a selected controller. At 503, the controller uses a protocol such as RTSP to establish a session with the device. At 505, based on the established session, the content server transmits the media stream to the device using protocols such as RTP and RTCP.

At 507, the content server obtains a packet stream for insertion into the media stream. At 509, packets are removed from a media stream based on time information associated with timestamps in the media stream. At 511, timestamp and sequence numbers are provided for packets in the insertion stream. According to various embodiments, the frames in the packets stream for insertion are configured to begin with an I-frame. In particular examples, an insertion stream having the same bit rate as the section removed is selected for inclusion in the transmitted media stream. Even though the insertion may use the same total number of bits and have the same bit rate as the section removed from the media stream, a different number of packets may be used to carry the frame data. Consequently, the content server manages and must modify sequence numbers for subsequent packets at 513 even after the insertion stream as added to the media stream.

A variety of devices can be used with the techniques and mechanisms of the present invention. According to various embodiments, a content server includes a processor, memory, and a streaming interface. Specifically configured devices can also be included to allow rapid modification of sequence numbers.

Figure 6:
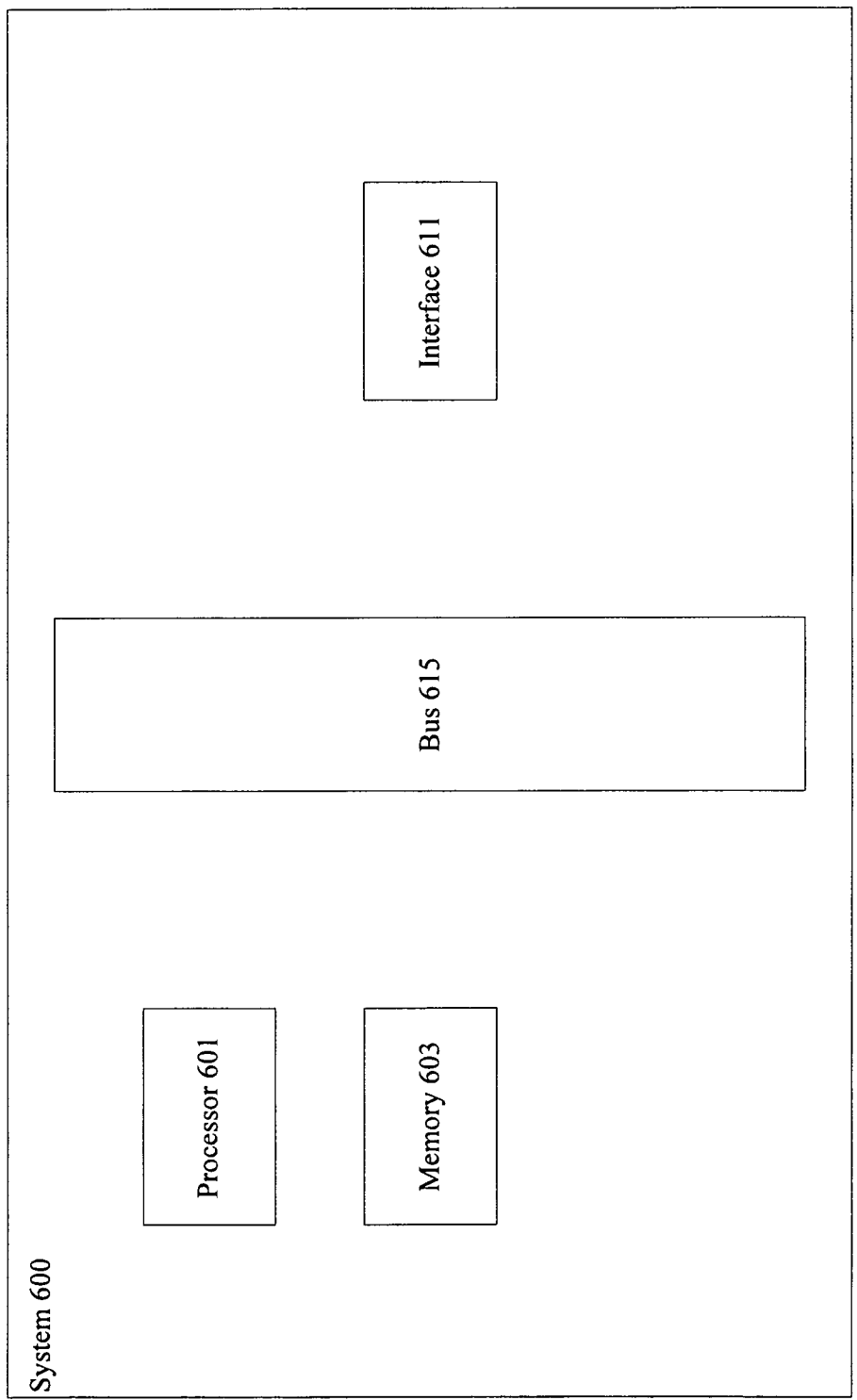
FIG. 6 illustrates one example of a system for processing media streams.

FIG. 6 illustrates one example of a content server that can perform live stream modification. According to particular embodiments, a system 600 suitable for implementing particular embodiments of the present invention includes a processor 601, a memory 603, an interface 611, and a bus 615 (e.g., a PCI bus or other interconnection fabric) and operates as a streaming server. When acting under the control of appropriate software or firmware, the processor 601 is responsible for modifying and transmitting live media data to a client. Various specially configured devices can also be used in place of a processor 601 or in addition to processor 601. The interface 611 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 600 is a content server that also includes a transceiver, streaming buffers, an program guide information. The content server may also be associated with subscription management, logging and report generation, and monitoring capabilities. In particular embodiments, functionality for allowing operation with mobile devices such as cellular phones operating in a particular cellular network and providing subscription management. Acve, an authentication module verifies the identity of devices including mobile devices. A logging and report generation module tracks mobile device requests and associated responses. A monitor system allows an administrator to view usage patterns and system availability. According to various embodiments, the content server 691 handles requests and responses for media content related transactions while a separate streaming server provides the actual media streams.

Although a particular content server 691 is described, it should be recognized that a variety of alternative configurations are possible. For example, some modules such as a report and logging module 653 and a monitor 651 may not be needed on every server. Alternatively, the modules may be implemented on another device connected to the server. In another example, the server 691 may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

What is claimed is:

1. A method, comprising: receiving a request from a device at a content server, the request associated with a session and corresponding to a media stream including a plurality of packets;
identifying a plurality of media stream variants, the plurality of media stream variants encoded by the content server at varying bit rates;
selecting one of the plurality of media stream variants to be an insertion sequence, wherein the selected one of the plurality of media stream variants is selected so that the insertion sequence has the same bit rate as a removal sequence, wherein the removal sequence encodes media content for presentation as part of the media stream, wherein the selected media stream variant encodes media content for presentation in place of the removal sequence;

obtaining the insertion sequence for inclusion in the media stream, the insertion sequence having an insertion sequence start packet including key frame data, the insertion sequence also having an insertion stream end packet;

extracting the removal sequence from the media stream to allow inclusion of the insertion stream in the media stream; and modifying sequence number information for a media stream restart packet and packets following the media stream restart packet using sequence number information from the insertion sequence end packet.

2. The method of claim 1, wherein the insertion sequence includes a first number of packets.

3. The method of claim 2, wherein the removal sequence includes a second number of packets different from the first number.

4. The method of claim 1, wherein the insertion sequence is selected based at least partially on a bit rate match with the removal sequence.

5. The method of claim 4, wherein the insertion sequence is selected based at least partially on a timestamp information match with the removal sequence.

6. The method of claim 1, wherein the media stream is a Real-Time Transport Protocol (RTP) stream.

7. The method of claim 1, wherein the content server is connected over a network to a controller operable to establish a session with the device using a Real-Time Streaming Protocol (RTSP).

8. The method of claim 1, wherein the plurality of packets hold I-frames, P-frames, and B-frames.

9. The method of claim 8, wherein the content server includes the insertion sequence without decoding payload data in the plurality of packets.

10. A system, comprising:
an interface operable to receive a request from a device at a content server, the request associated with a session and corresponding to a media stream including a plurality of packets; and
a processor operable to identify a plurality of media stream variants, the plurality of media stream variants encoded by the content server at varying bit rates,
select one of the plurality of media stream variants to be an insertion sequence, wherein the selected one of the plurality of media stream variants is selected so that the insertion sequence has the same bit rate as a removal sequence, wherein the removal sequence encodes media content for presentation as part of the media stream, wherein the selected media stream variant encodes media content for presentation in place of the removal sequence, wherein the insertion sequence is obtained for inclusion in the media stream, the insertion sequence having an insertion sequence start packet including key frame data, the insertion sequence also having an insertion stream end packet, the processor further operable to extract a removal sequence from the media stream to allow inclusion of the insertion stream in the media stream;
wherein sequence number information for a media stream restart packet and packets following the media stream restart packet are modified using sequence number information from the insertion sequence end packet.

11. The system of claim 10, wherein the insertion sequence includes a first number of packets.

12. The system of claim 11, wherein the removal sequence includes a second number of packets different from the first number.

13. The system of claim 10, wherein the insertion sequence is selected based at least partially on a bit rate match with the removal sequence.

14. The system of claim 13, wherein the insertion sequence is selected based at least partially on a timestamp information match with the removal sequence.

15. The system of claim 10, wherein the media stream is a Real-Time Transport Protocol (RTP) stream.

16. The system of claim 10, wherein the content server is connected over a network to a controller operable to establish a session with the device using a Real-Time Streaming Protocol (RTSP).

17. The system of claim 10, wherein the plurality of packets hold I-frames, P-frames, and B-frames.

18. The system of claim 17, wherein the content server includes the insertion sequence without decoding payload data in the plurality of packets.

19. An apparatus, comprising:
means for receiving a request from a device at a content server, the request associated with a session and corresponding to a media stream including a plurality of packets;
means for identifying a plurality of media stream variants, the plurality of media stream variants encoded by the content server at varying bit rates;
means for selecting one of the plurality of media stream variants to be an insertion sequence, wherein the selected one of the plurality of media stream variants is selected so that the insertion sequence has the same number of bits and the same bit rate as a removal sequence, wherein the removal sequence encodes media content for presentation as part of the media stream, wherein the selected media stream variant encodes media content for presentation in place of the removal sequence;
means for obtaining the insertion sequence for inclusion in the media stream, the insertion sequence having an insertion sequence start packet including key frame data, the insertion sequence also having an insertion stream end packet;
means for extracting the removal sequence from the media stream to allow inclusion of the insertion stream in the media stream; and
means for modifying sequence number information for a media stream restart packet and packets following the media stream restart packet using sequence number information from the insertion sequence end packet.

20. The apparatus of claim 19, wherein the insertion sequence includes a first number of packets.

* * * * *